United States Patent
Bates et al.

(10) Patent No.: US 9,471,464 B1
(45) Date of Patent: *Oct. 18, 2016

(54) DEBUG MANAGEMENT USING DYNAMIC ANALYSIS BASED ON STATE INFORMATION

(71) Applicant: International Business Machines Corporation, Armonk, NY (US)

(72) Inventors: Cary L. Bates, Rochester, MN (US); Lee Helgeson, Rochester, MN (US); Justin K. King, Rochester, MN (US); Michelle A. Schlicht, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,497

(22) Filed: Jun. 24, 2015

Related U.S. Application Data

(63) Continuation of application No. 14/688,821, filed on Apr. 16, 2015.

(51) Int. Cl.
*G06F 9/44* (2006.01)
*G06F 11/36* (2006.01)

(52) U.S. Cl.
CPC ......... *G06F 11/362* (2013.01); *G06F 11/3612* (2013.01)

(58) Field of Classification Search
None
See application file for complete search history.

(56) References Cited

U.S. PATENT DOCUMENTS

| | | | | |
|---|---|---|---|---|
| 5,581,696 A | * | 12/1996 | Kolawa | G06F 11/3624 714/38.1 |
| 5,909,577 A | * | 6/1999 | Devanbu | G06F 11/3624 714/E11.209 |
| 6,077,312 A | * | 6/2000 | Bates | G06F 11/362 714/E11.21 |
| 6,324,683 B1 | * | 11/2001 | Fuh | G06F 11/362 714/E11.21 |
| 6,634,020 B1 | * | 10/2003 | Bates | G06F 11/362 712/227 |
| 6,721,941 B1 | * | 4/2004 | Morshed | G06F 11/3612 709/217 |

(Continued)

OTHER PUBLICATIONS

Scott-NPL-IEEE-2003, Author: Scott et al., Title: "Retargetable and Reconfigurable Software Dynamic Translation", IEEE, 2001.*

(Continued)

*Primary Examiner* — Wei Zhen
*Assistant Examiner* — Hossain Morshed
(74) *Attorney, Agent, or Firm* — Kevin Kehe

(57) ABSTRACT

Disclosed aspects include a debugger evaluating an expression. The expression has a debug element. Using dynamic analysis, a set of state information related to the debug element is identified. The set of state information can be generated external to the debugger and used within the debugger subsequent to being generated. Utilizing the set of state information, a tolerance parameter is selected. The tolerance parameter is for a conditional breakpoint linked with the debug element. In response to selecting the tolerance parameter, a triggering event for the conditional breakpoint may be detected. Based on the tolerance parameter, it may be determined to disregard the triggering event. Subsequently, the triggering event can be disregarded. Altogether, aspects of the disclosure provide a methodology for debug management that may provide performance or efficiency benefits.

12 Claims, 4 Drawing Sheets

(56) References Cited

U.S. PATENT DOCUMENTS

| | | | |
|---|---|---|---|
| 6,795,962 B1* | 9/2004 | Hanson | G06F 11/362 714/E11.209 |
| 7,526,756 B2 | 4/2009 | Bates et al. | |
| 8,091,075 B2 | 1/2012 | Bates et al. | |
| 8,195,981 B2* | 6/2012 | Gollub | G06F 11/0712 714/16 |
| 8,997,049 B1* | 3/2015 | Melnikov | G06F 11/362 717/124 |
| 2004/0083457 A1* | 4/2004 | Boucher | G06F 11/3636 717/129 |
| 2005/0172272 A1* | 8/2005 | Bates | G06F 11/362 717/129 |
| 2005/0289396 A1* | 12/2005 | Hooper | G06F 11/3664 714/34 |
| 2007/0105607 A1* | 5/2007 | Russell | G06F 11/0709 463/1 |
| 2007/0168994 A1* | 7/2007 | Barsness | G06F 11/362 717/129 |
| 2007/0250819 A1* | 10/2007 | Fjeldstad | G06F 11/3664 717/129 |
| 2008/0250273 A1* | 10/2008 | Yilmaz | G06F 11/3636 714/38.14 |
| 2008/0256517 A1* | 10/2008 | Atkin | G06F 11/3688 717/124 |
| 2012/0110384 A1* | 5/2012 | Brunet | G06F 11/3624 714/37 |
| 2012/0151452 A1* | 6/2012 | Zinkovsky | G06F 11/362 717/129 |
| 2012/0151453 A1* | 6/2012 | Finking | G06F 11/3624 717/130 |
| 2012/0304156 A1* | 11/2012 | Feiveson | G06F 11/3648 717/131 |
| 2013/0036254 A1* | 2/2013 | Fai | G06F 11/263 711/103 |
| 2013/0042150 A1* | 2/2013 | McNeeney | G06F 11/366 714/38.1 |
| 2013/0055207 A1* | 2/2013 | Cui | G06F 11/3608 717/125 |
| 2013/0318504 A1* | 11/2013 | Eker | G06F 11/3636 717/128 |
| 2014/0033183 A1* | 1/2014 | Brown | G06F 11/3636 717/131 |
| 2014/0123116 A1* | 5/2014 | Smiljanic | G06F 11/3664 717/130 |
| 2015/0347269 A1* | 12/2015 | Nelson | G06F 11/362 717/134 |

OTHER PUBLICATIONS

NPL-MS-How to Specify a Hit Count-2010, Article title: "How to: Specify a Hot Count", Visual Studio 2010, Published at https://msdn.microsoft.com/en-us/library/yy96wbwd(v=vs.100).aspx.*

JavaScript Debugger and Profiler : Firebug, <http://getfirebug.com/javascript>.

How to set conditional breakpoints in Visual Studio .NET or in Visual Studio 2005, <http://support.microsoft.com/kb/308469>.

Bates et al., "Debug Management Using Dynamic Analysis Based on State Information", U.S. Appl. No. 14/688,821, filed Apr. 16, 2015.

List of IBM Patents or Patent Applications Treated As Related.

* cited by examiner

US 9,471,464 B1

DEBUG MANAGEMENT USING DYNAMIC ANALYSIS BASED ON STATE INFORMATION

BACKGROUND

This disclosure relates generally to computer systems and, more particularly, relates to debug management. As computers have become faster and available memory has increased, software has also become more and more complex. A typical software application may contain millions of lines of code. With the increased complexity of software applications, the issues associated with the code as written have become more numerous and difficult to resolve. As code complexity has increased, the need for debug management efficiency may increase.

SUMMARY

Aspects of the disclosure leverage run-time routines associated with the dynamic analysis instrumentation code to determine if a specific analysis error may be in the Boolean expression that is being executed by the debugger. One or more routines from a dynamic analyzer may be called that can detect an error event. The user can utilize one or more directives on the conditional breakpoint to control firing if such an error is detected. For instance, when a conditional breakpoint is set on a path where one of the variables referenced in the Boolean expression may or may not be initialized, the user can specify that no matter what the value of that variable may be, do not stop if the variable is not initialized.

Aspects of the disclosure include a debugger evaluating an expression. The expression has a debug element. Using dynamic analysis, a set of state information related to the debug element is identified. The set of state information can be generated external to the debugger and used within the debugger subsequent to being generated. Utilizing the set of state information, a tolerance parameter is selected. The tolerance parameter is for a conditional breakpoint linked with the debug element. In response to selecting the tolerance parameter, a triggering event for the conditional breakpoint may be detected. Based on the tolerance parameter, it may be determined to disregard the triggering event. Subsequently, the triggering event can be disregarded. Altogether, aspects of the disclosure provide a methodology for debug management that may provide performance or efficiency benefits.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
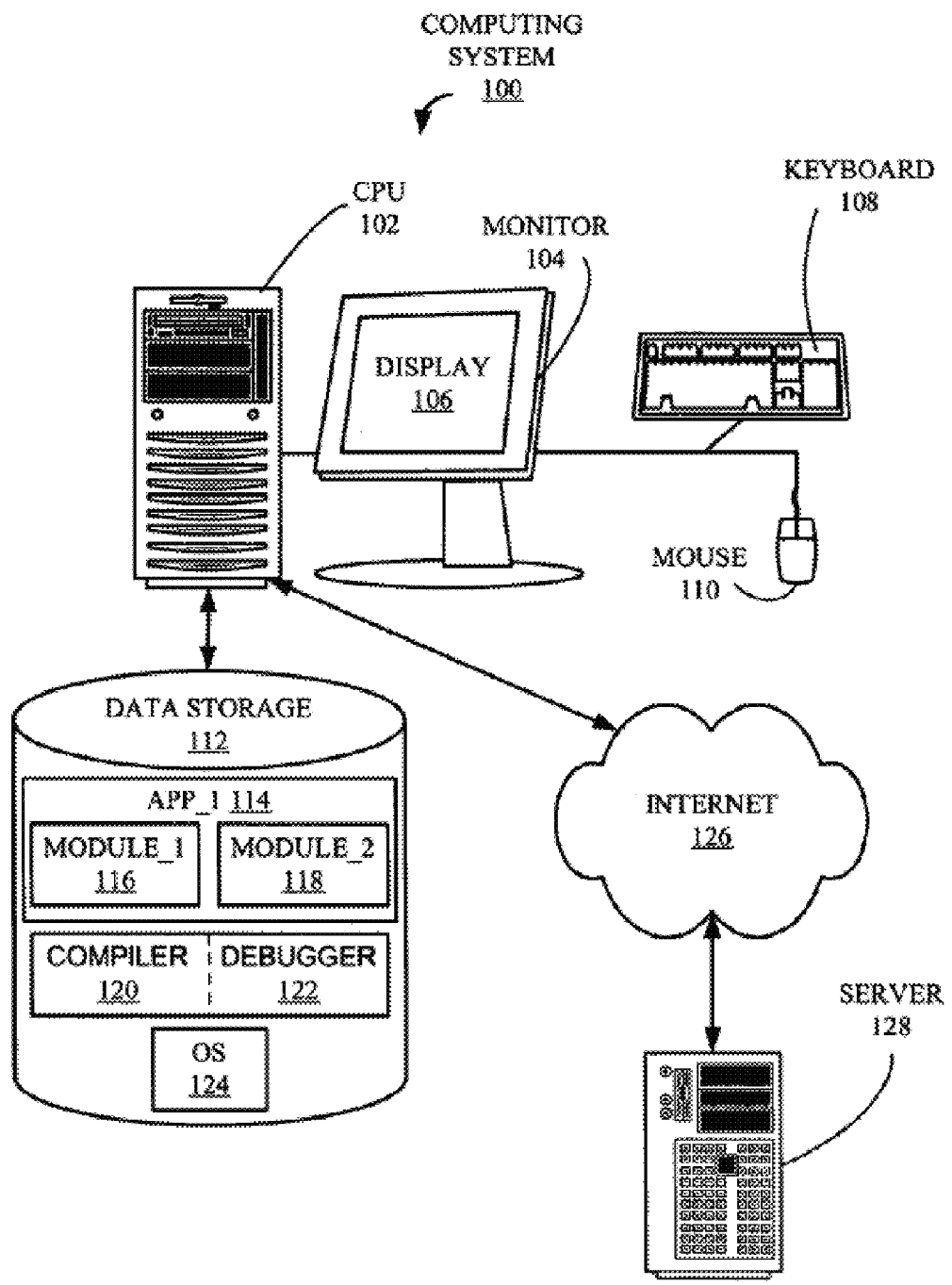
FIG. 1 depicts an exemplary computing system according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include testing a Boolean expression at the time which the resulting byte code is interpreted for execution errors. One or more routines from a dynamic analyzer may be called that can detect an error event (e.g., errors that would otherwise not be detected and can cause random behavior with respect to a conditional breakpoint). The user can utilize one or more directives on the conditional breakpoint to control firing if such an error is detected.

Aspects of the disclosure leverage run-time routines associated with the dynamic analysis instrumentation code to determine if an error may be in the Boolean expression that is being executed by the debugger. Both adding control information and such additional checking can provide the user with increased options for performance, efficiency, debuggability, or flexibility (e.g., options they otherwise would not have). For instance, when a conditional breakpoint is set on a path where one of the variables referenced in the Boolean expression may or may not be initialized, the user can specify that no matter what the value of that variable may be, do not stop if the variable is not initialized.

Debuggers handle program control (e.g., breakpoints, stepping) and expression evaluation (e.g., displaying variables). These two parts of the debugger are joined when the user specifies a conditional breakpoint. Conditional breakpoints are useful because they allow users to stop when particular conditions are true. The Boolean expression is converted to a byte code expression and when the breakpoint is encountered, the byte code is sent to an interpreter and evaluated. If the value returned is true the breakpoint halts, if the value returned is false the execution continues. With the integration of instrumentation code into to the debuggable program, errors such as uninitialized memory reads, array bounds reads and writes, and many other errors can be detected at run-time.

Because it is often desirable to reference variables within conditional breakpoints at locations where they are in scope but not referenced in the source code, users may want to set a breakpoint at a location in which sometimes the variable may be initialized and sometimes it may not. Users may benefit from being able to set a conditional breakpoint at locations in the code where a variable used within the Boolean expression may or may not be initialized depending on the path taken to reach that location.

Aspects of the disclosure include a method, a system, and a computer program product for debug management. A debugger evaluates an expression. The expression has a debug element (e.g., debug directive, incomplete/imperfect parameter, uninitialized variable). Using dynamic analysis, a set of state information related to the debug element is identified. Utilizing the set of state information, a tolerance parameter is selected. The tolerance parameter is for a conditional breakpoint linked with the debug element.

In embodiments, the debug element is transmitted to a dynamic analyzer for dynamic analysis. Subsequently, the set of state information may be received from the dynamic analyzer. The transmitting of the debug element and receiving of the set of state information can serve as an identifying operation (identifying the set of state information). The debugger and the dynamic analyzer may be separate. As such, the set of state information can be generated external to the debugger and used within the debugger subsequent to being generated.

In embodiments, debug processing may occur. In response to selecting the tolerance parameter, a triggering event for the conditional breakpoint may be detected. Based on the tolerance parameter, it may be determined to disregard the triggering event. Subsequently, the triggering event can be disregarded (e.g., not stopping at the conditional breakpoint when debugging). Altogether, aspects of the disclosure provide a methodology for debug management that may provide performance or efficiency benefits (e.g., speed, flexibility, responsiveness, resource usage).

Turning now to the figures, FIG. 1 is a block diagram of an exemplary computing system architecture 100 which can incorporate aspects of the disclosure including the claimed subject matter. A central processing unit (CPU) 102 is coupled to a monitor 104, a keyboard 108 and a mouse 110, which together facilitate human interaction with computing system 100. Within monitor 104 is a display 106 that presents a graphical user interface (GUI) for applications such as an exemplary application, or "App_1," 114. CPU 102 is coupled to a data storage component 112, which may either be incorporated into CPU 102 (i.e., an internal device), or attached externally to CPU 102 by means of various, commonly available connection devices such as but not limited to, a universal serial bus (USB) port (not shown). Data storage 112 is illustrated storing exemplary software application, or "App_1," 114, which includes two (2) exemplary computer programming modules (i.e., a "Module_1," 116 and a "Module_2," 118). Module_1 116 is shown in more detail below in conjunction with FIG. 4. It should be noted that a typical computing system would include more than one application and a typical application would include more than two (2) modules, but for the sake of simplicity only one application and two modules are shown. Also stored on data storage 112 is a compiler 120, which includes a debugger component 122. Compiler 120 and debugger 122 are configured to implement aspects of the disclosure including the claimed subject matter, as described herein.

CPU 102 is connected to the Internet 126, which is also connected to a server computer 128. Although in this example, CPU 104 and server 128 are communicatively coupled via the Internet 126, they could also be coupled through any number of communication mediums such as, but not limited to, a local area network (LAN) (not shown). Further, it should be noted there are many possible computing system configurations that may support the claimed subject matter, of which computing system 100 is only one simple example.

Figure 2:
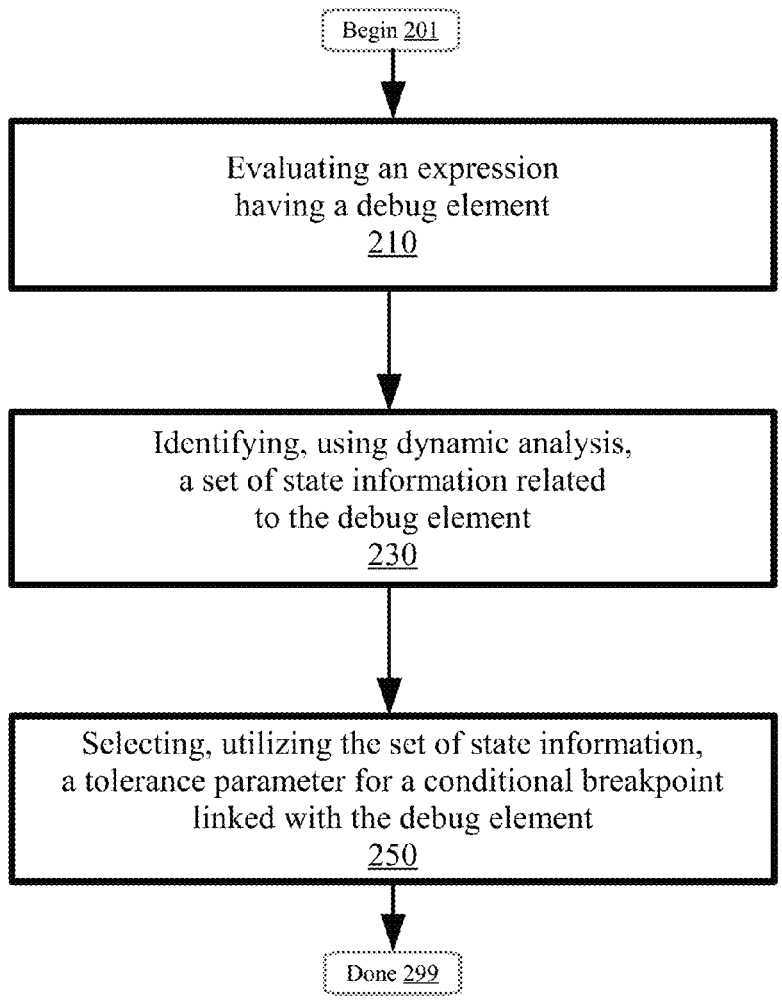
FIG. 2 is a flowchart illustrating a method for debug management according to embodiments.

FIG. 2 is a flowchart illustrating a method 200 for debug management according to embodiments. Aspects of the methodology may use outside/external state information within the debugger. In certain embodiments, uninitialized variables in Boolean expressions are detected using run-times routines associated with dynamic analysis instrumentation code. Various aspects can control firing of conditional breakpoints for uninitialized variables. Method 200 may begin at block 201.

At block 210, an expression is evaluated (by a debugger). The (Boolean) expression has a debug element. For example, the debug element may include a debug directive. To illustrate, the debug directive can include one or more commands, instructions, orders, or directions that encode one or more actions, operations, or processes where such actions, operations, or processes are associated with tracing or debugging techniques. For example, the debug element may include an incomplete parameter. To illustrate, the incomplete parameter can include a parameter which is imperfect, unfit, incapable, lacking, limited, flawed, deficient, defective, impaired, or inexact in a semantic nature for use in a subroutine to refer to one of the pieces of data provided as input to the subroutine. For example, the debug element may include an uninitialized variable. To illustrate, the uninitialized variable can include a variable that is declared but is not set to a definite known value before it is used—it will have some value, but not a predictable one. For instance, evaluating the expression can include calling a routine associated with a dynamic analysis run-time to test for an error in a memory element (e.g., test whether memory has or has not been freed).

At block 230, a set of state information related to the debug element is identified. Dynamic analysis can be used to identify the set of state information. Dynamic analysis may include identifying an error event at run-time by executing an application program on a real or virtual processor. In embodiments, a dynamic analyzer may be used to perform the dynamic analysis. For instance, the set of state information may pertain to memory and include an affected-location factor and an affected-size factor (e.g., which particular and how much memory has or has not been freed with respect to a particular memory access error event). As such, the set of state information can include an exact error location/memory address, a set of memory leak data, an array bound access, an unallocated memory event, or other information related to data structures.

At block 250, a tolerance parameter is selected. The tolerance parameter is selected utilizing the set of state information (e.g., which arises-out-of/is-derived-from the debug element). The tolerance parameter is for a conditional breakpoint linked with the debug element. The tolerance parameter may serve to tolerate/accept/endure/permit a feature/value (e.g., arising out of the debug element) that would otherwise initiate a response to the feature/value (e.g., as such the feature/value is tolerated without initiating the response). The tolerance parameter can be selected such that debugging continues (e.g., effectively does not stop) no matter what the value of the debug element may be (e.g., an incomplete parameter—which would otherwise cause debugging to entirely stop). In embodiments, the tolerance parameter may force a binary value (e.g., force TRUE, force FALSE) when evaluating the expression. Such action, by selecting the tolerance parameter, may allow for debugging options which are otherwise challenging to undertake/implement.

Method 200 concludes at block 299. Aspects of method 200 may provide performance or efficiency benefits for debug management. For example, aspects of method 200 may include capability/flexibility to refer to variables within conditional breakpoints at locations where they are in scope but not referred to in the source code. Altogether, performance or efficiency benefits when debugging may occur (e.g., speed, flexibility, responsiveness, resource usage).

Figure 3:
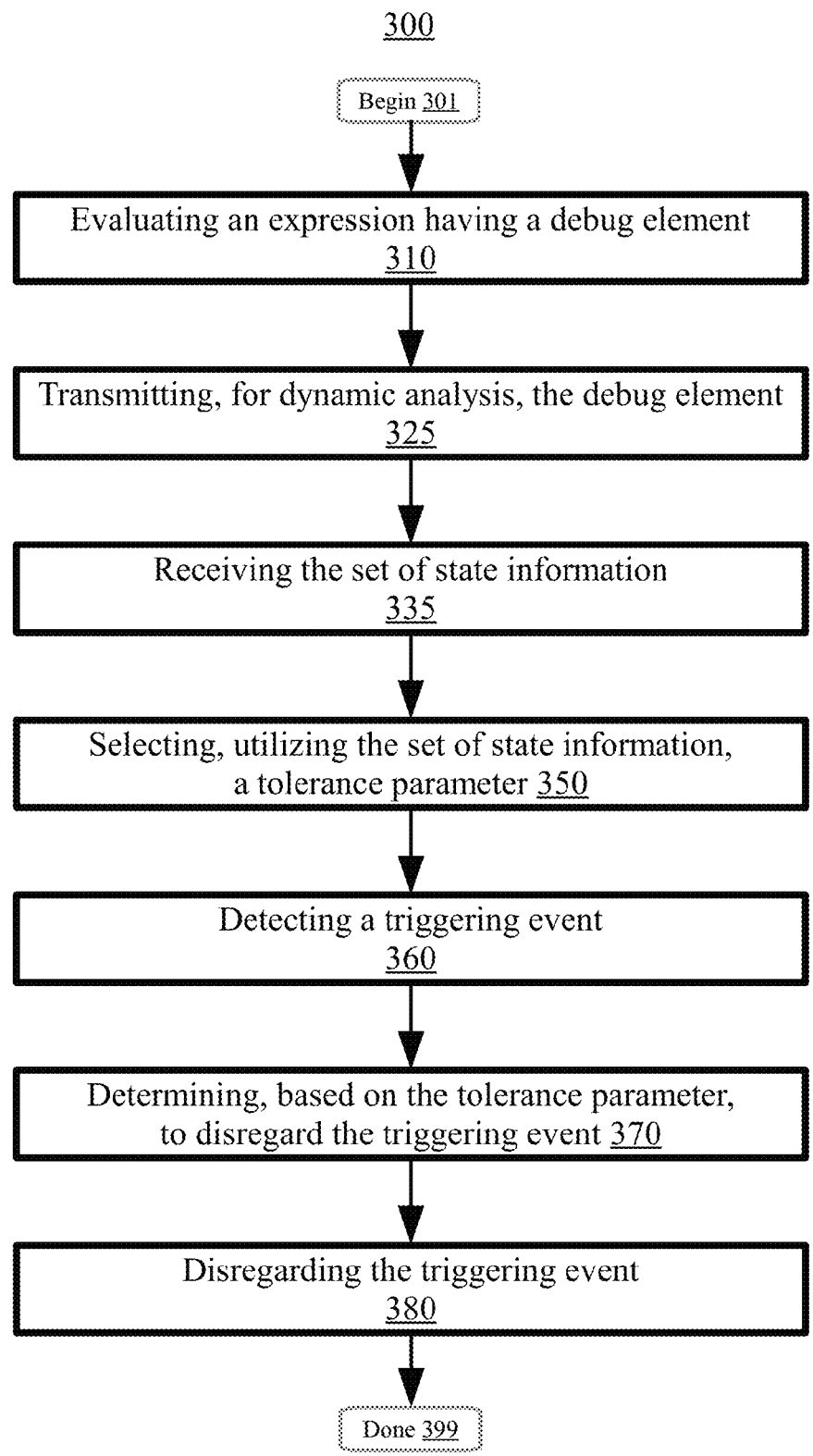
FIG. 3 is a flowchart illustrating a method for debug management according to embodiments.

FIG. 3 is a flowchart illustrating a method 300 for debug management according to embodiments. Method 300 may include aspects of method 200. As such, aspects of method 300 may be useful in implementing overall operation of debug management according to method 200. Method 300 may begin at block 301. At block 310, an expression which has a debug element is evaluated (by a debugger).

A set of state information related to the debug element is identified. Dynamic analysis can be used to identify the set of state information. At block 325, the debug element is transmitted to a dynamic analyzer for dynamic analysis. Transmitting the debug element can include wrapping a data packet with a specific classification of information for run-time analysis by the dynamic analyzer. The debugger and the dynamic analyzer may be separate (e.g., physically separate on different compute nodes). At block 335, the set of state information may be received from the dynamic analyzer. As such, the set of state information can be generated external to the debugger (e.g., generated by the dynamic analyzer) and used within the debugger subsequent to being generated (e.g., in response to being received). In embodiments, the dynamic analyzer may create, package, and transmit/send the set of state information (to the debugger). The set of state information may be based on (e.g., arise out of, derive from) the debug element. In certain embodiments, the debugger and the dynamic analyzer may be included in a shared pool of configurable computing resources (e.g., cloud environment).

At block 350, a tolerance parameter is selected. The tolerance parameter is selected utilizing the set of state information. The tolerance parameter is for a conditional breakpoint linked with the debug element. In response to selecting the tolerance parameter, a triggering event (e.g., command to initiate firing, initiating firing, firing) for the conditional breakpoint may be detected at block 360. Based on the tolerance parameter (e.g., true/false, 1/0, hot/cold, 88/34), it may be determined to disregard (e.g., ignore, suppress, bypass, skip, not perform) the triggering event at block 370. Subsequently, the triggering event can be disregarded (e.g., not stopping at the conditional breakpoint when debugging) at block 380.

Method 300 concludes at block 399. Aspects of method 300 may provide performance or efficiency benefits for debug management. For example, aspects of method 300 may include capability/flexibility to refer to variables within conditional breakpoints at locations where they are in scope but not referred to in the source code. Altogether, performance or efficiency benefits when debugging may occur (e.g., speed, flexibility, responsiveness, resource usage).

Figure 4:
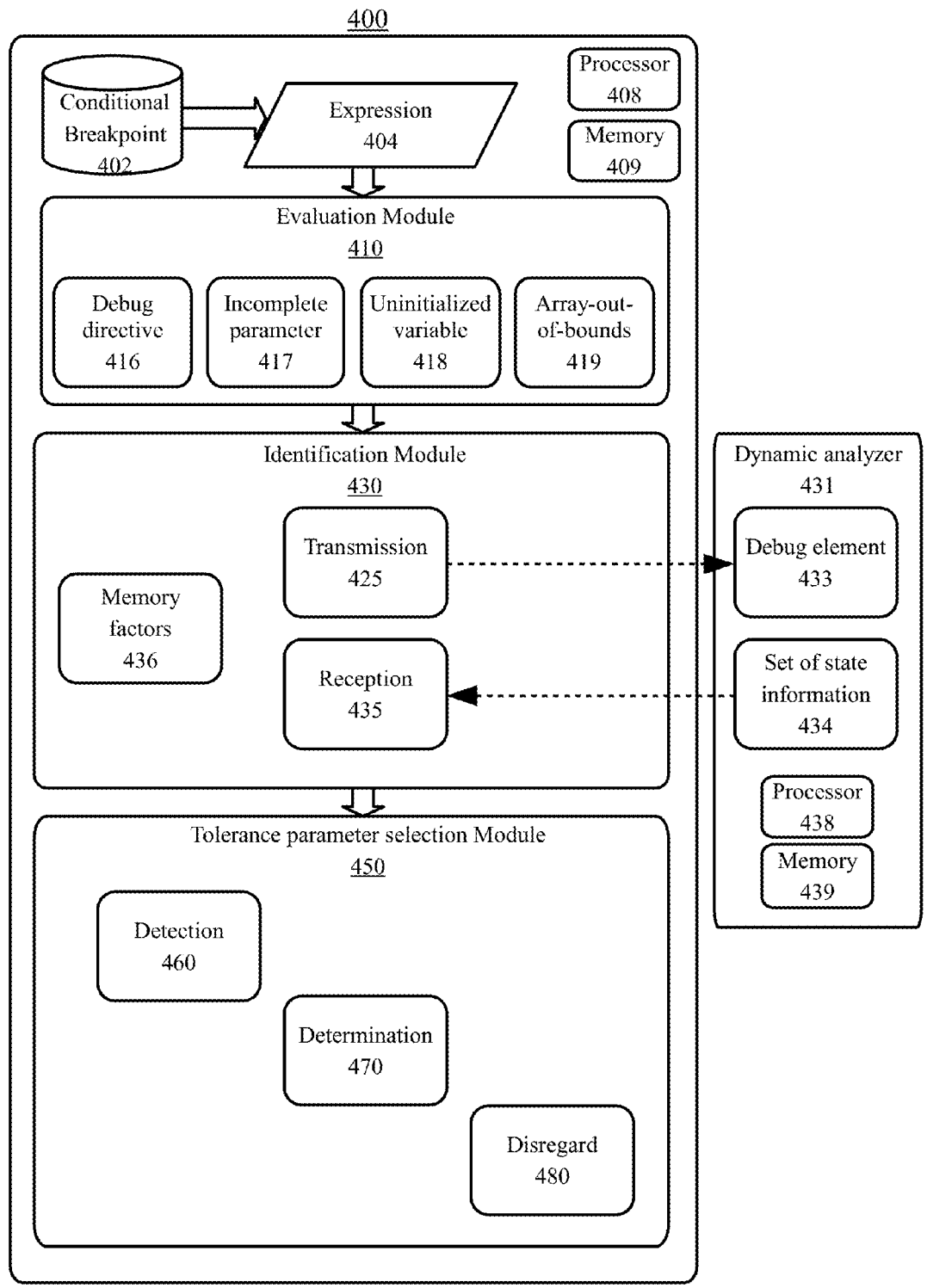
FIG. 4 shows an example system for debug management according to embodiments.

FIG. 4 shows an example system 400 for debug management according to embodiments. The system 400 includes a processor 408, a memory 409, a conditional breakpoint 402, and an expression 404. In embodiments, method 200 or 300 may be used/applied/implemented with respect to the system 400. Though other combinations (including other aspects/features) are considered, the diagram includes examples such as an evaluation module 410, an identification module 430, and a tolerance parameter selection module 450. In embodiments, a separate tool such as a dynamic analyzer 431 may be used for dynamic analysis. Depicted aspects may correspond to aspects described in method 200 or 300.

In embodiments, the evaluation module 410 includes various components for checking errors that can be caught by a dynamic analyzer. The components can include a debug directive component 416, an incomplete parameter component 417, an uninitialized variable component 418, or an array-out-of-bounds component 419. The identification module 430 may include a transmission component 425 (for transmitting the debug element to the dynamic analyzer 431) and a reception component 435 (for receiving the set of state information from the dynamic analyzer 431). In certain instances, the identification module 430 has a memory factors feature 436. In embodiments, the tolerance parameter selection module 450 includes a detection component 460, a determination component 470, and a disregard component 480. In embodiments the dynamic analyzer 431 includes a processor 438, a memory 439, a debug element component 433 (for use to perform dynamic analysis on a debug element transmitted from within the debugger), and a set of state information component 434 (for generating the set of state information which can be external to the debugger to be sent to the debugger for use within the debugger). Consider the example that follows.

Aspects of the disclosure can make one or more calls to one or more routines associated with the dynamic analysis run-time to test memory locations and addresses for error event(s) when the Boolean expression (404) is evaluated (410). These error events are the sort of error events that may not otherwise be (directly) caught by the evaluation of the Boolean condition. For instance, without the dynamic analysis instrumentation (431) tracking program values, an access to an uninitialized integer variable (418) may not be detected when evaluating (410) the Boolean expression (404). An action when one of these error events is detected by the dynamic analysis routines can be to cause the breakpoint to fire so the user will not miss anything due to the error, but additional controls can be used to override this behavior.

For instance, consider: "stop at 22 if @if_UM_false(A)> 1000". "@if_UM_false( )" tells the expression evaluator test/identify (430) the element/parameter to this directive (416) and if it happens to be uninitialized (417, 418), the value of the whole expression should be false. When it generates the byte code for the Boolean expression (404), it generates special byte codes (e.g., tolerance parameters) that will call dynamic analysis routines to check "A" to see if it is initialized and return "FALSE" if it is not initialized. If it is initialized it will evaluate the rest of the expression as normal. Other directives (e.g., tolerance parameters) like "@NOCHK( )" may tell the expression evaluator not to check this variable for errors. Or it may be a flag (e.g., tolerance parameters at 450) that covers the whole Boolean expression: "stop at 4 if −NOCHK a<b". This "NOCHK" directive may not mean that checking would not be done. It still would be, but the breakpoint would not fire due to the checking (e.g., disregarded at 480). The results of checking the Boolean routine may be useful when the breakpoint fires. Regardless of the directives used, when the conditional breakpoint fires it can report error events that are detected when evaluating the Boolean expression at this stop. Consider:

(dbx) stop at 4 if −NOCHK a<b
(dbx) continue
stopped at 4 if a<b variable 'b' uninitialized.
(dbx)

Reporting can assist the user efficiently determine problems with the program and understand why the breakpoint may have fired. Assistance can therefore be provided to know if stopping is being done at the point in execution that it is desired to be stopped.

While aspects herein discuss uninitialized variables, various error events that can be detected (e.g., by the dynamic analyzer) can be handled with similar directives to provide the user flexibility when using conditional breakpoints. For instance, consider a branch where sometimes the memory accessed by the Boolean expression may have been freed but we only care about stopping in the case its not been freed. Without support like that discussed herein, the user may need to find another breakpoint location and then try to step to the location they really want to be stopped at. Consider: "stop at 1236 if @if_FM_false(ptr)→total>12348". As such, if the memory pointed to by ptr has been freed, the Boolean expression should return false, otherwise evaluate the expression normally.

Aspects of system 400 may provide performance or efficiency benefits for debug management. For example, aspects of system 400 may include capability/flexibility to refer to variables within conditional breakpoints at locations where they are in scope but not referred to in the source code. Altogether, performance or efficiency benefits when debugging may occur (e.g., speed, flexibility, responsiveness, resource usage).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for debug management, the system comprising:
    a memory having a set of computer readable computer instructions, and
    a processor for executing the set of computer readable instructions, the set of computer readable instructions including:
    evaluating, by a debugger, an expression having a debug element, wherein the debug element includes at least one of:
    an uninitialized variable,
    an incomplete parameter, or
    a debug directive;
    identifying, using dynamic analysis, a set of state information related to the debug element;
    wherein the state information pertains to memory affected-location factor and memory affected-size factor;
    selecting, utilizing the set of state information, a tolerance parameter for a conditional breakpoint linked with the debug element, wherein the tolerance parameter is derived from the debug element;
    detecting, in response to selecting the tolerance parameter, a triggering event for the conditional breakpoint; and
    determining, based on the tolerance parameter, to disregard the triggering event.

2. The system of claim 1, wherein identifying, using dynamic analysis, the set of state information related to the debug element includes:
    transmitting, for dynamic analysis, the debug element to a dynamic analyzer; and
    receiving, from the dynamic analyzer, the set of state information.

3. The system of claim 2, wherein the debugger and the dynamic analyzer are separate, and wherein the set of state information is generated external to the debugger and used within the debugger subsequent to being generated.

4. The system of claim 1, wherein the debug element includes the uninitialized variable.

5. The system of claim 1, wherein the debug element includes the incomplete parameter.

6. The system of claim 1, wherein the debug element includes the debug directive.

7. The system of claim 1, further comprising:
disregarding, in response to determining to disregard the triggering event, the triggering event, wherein disregarding the triggering event includes not stopping at the conditional breakpoint when debugging.

8. The system of claim 1, wherein evaluating the expression includes calling a routine associated with a dynamic analysis run-time to test for an error in a memory element.

9. The system of claim 1, wherein the set of state information pertains to memory and includes an affected-location factor and an affected-size factor.

10. A computer program product for debug management, the computer program product comprising a computer readable storage medium having program instructions embodied therewith, wherein the computer readable storage medium is not a transitory signal per se, the program instructions executable by a processor to cause the processor to perform a method comprising:
evaluating, by a debugger, an expression having a debug element, wherein the debug element includes at least one of:
an uninitialized variable,
an incomplete parameter, or
a debug directive;
identifying, using dynamic analysis, a set of state information related to the debug element;
wherein the state information pertains to memory affected-location factor and memory affected-size factor;
selecting, utilizing the set of state information, a tolerance parameter for a conditional breakpoint linked with the debug element, wherein the tolerance parameter is derived from the debug element;
detecting, in response to selecting the tolerance parameter, a triggering event for the conditional breakpoint; and
determining, based on the tolerance parameter, to disregard the triggering event.

11. The computer program product of claim 10, wherein the program instructions are stored in a computer readable storage medium in a data processing system, and wherein the program instructions were downloaded over a network from a remote data processing system.

12. The computer program product of claim 10, wherein the program instructions are stored in a computer readable storage medium in a server data processing system, and wherein the program instructions are downloaded over a network to a remote data processing system for use in a computer readable storage medium with the remote data processing system.

* * * * *